May 14, 1968 J. L. CARROLL 3,383,119
AUTO TRAILER
Filed March 25, 1966 5 Sheets-Sheet 1

INVENTOR
James L. Carroll
BY
Hood, Gust & Irish
Attorneys

May 14, 1968  J. L. CARROLL  3,383,119
AUTO TRAILER

Filed March 25, 1966  5 Sheets-Sheet 3

INVENTOR
James L. Carroll
BY
Hood, Gust & Irish
Attorneys

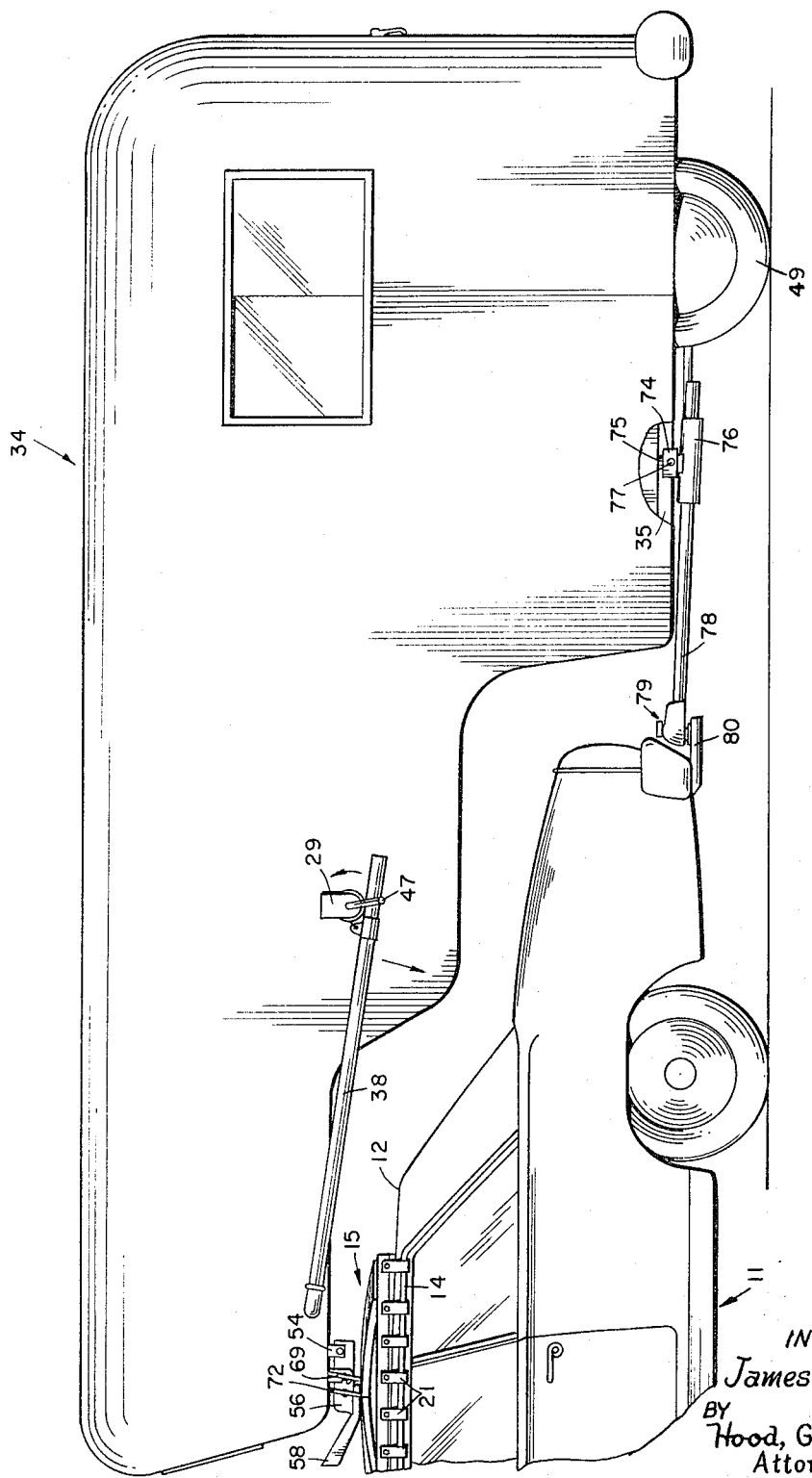

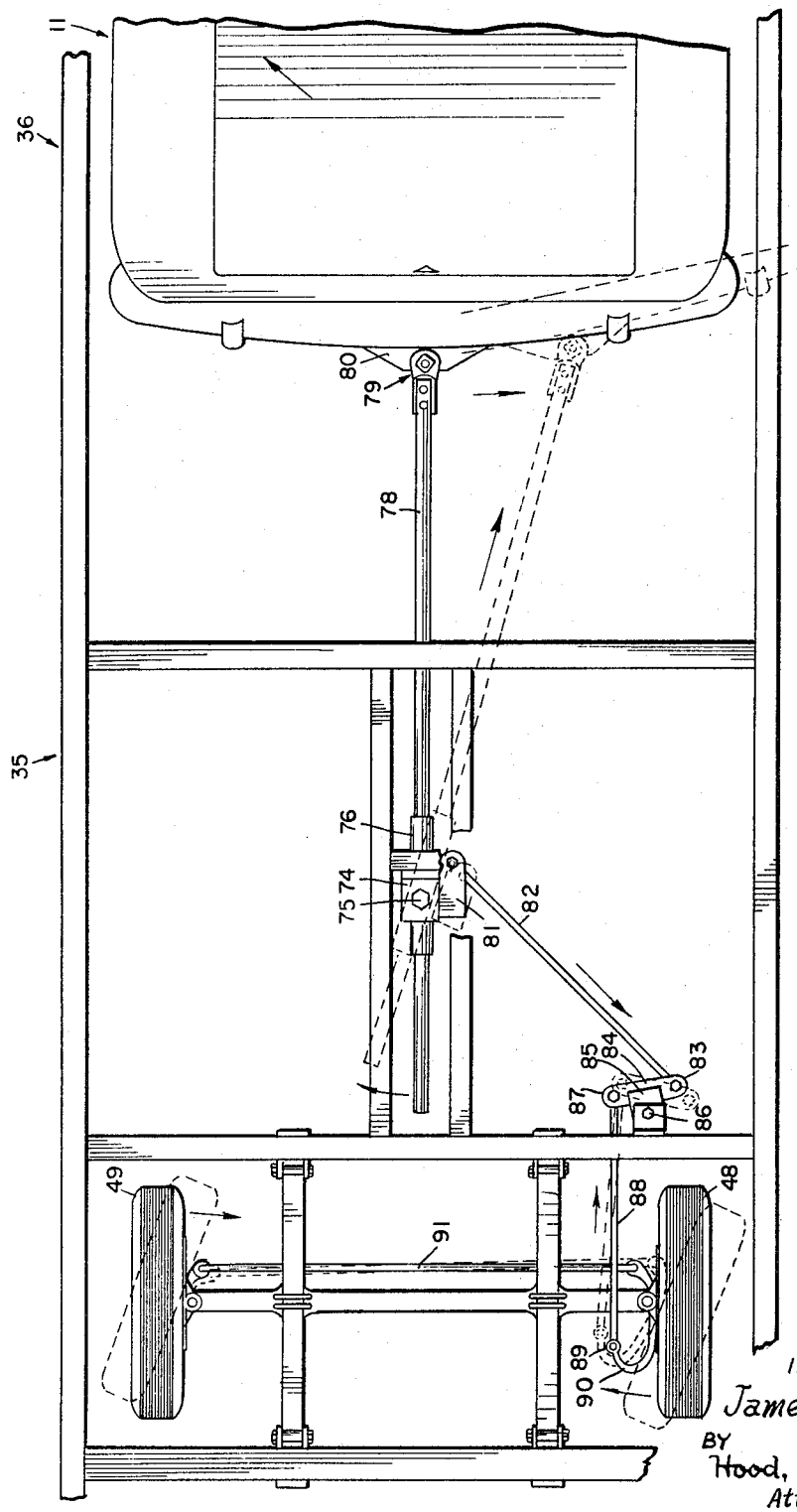

United States Patent Office 3,383,119
Patented May 14, 1968

3,383,119
AUTO TRAILER
James L. Carroll, Madisonville, La., assignor to Wilco Corporation, Indianapolis, Ind., a corporation of Indiana
Filed Mar. 25, 1966, Ser. No. 537,428
15 Claims. (Cl. 280—426)

ABSTRACT OF THE DISCLOSURE

A semi-trailer structure including a pad assembly comprising lateral members adapted to be secured to guttering on opposite sides of the roof of a passenger automobile and joined by crossed elements pivoted to each other at their mid-points to provide for width adjustment, a spheroid hitch element upstanding from said crossed member on an axis coincident with their pivot axis, a tongue on the trailer carrying a hitch element adapted to mate with said spheroid element, and detent means carried by one of said hitch elements and engageable with the other at times. In one form of the disclosure there is provided means associated with the hitch for controlling dirigible wheels on the trailer.

---

The present invention relates to an auto trailer, and is particularly concerned with the provision of an improved hitch between such a trailer and a conventional passenger automobile or cabbed truck, such hitch preferably including means providing an operative connection between the towing vehicle and the dirigible wheels of the trailer and including, as well, trailer-carried means for facilitating establishment and disestablishment of the towing hitch and for supporting the trailer when not operatively associated with the towing vehicle.

A primary object of the invention is to provide a hitch of such character that a significant part of the weight of a semi-trailer may be supported, through an articulated coupling, by the roof of the closed body of a conventional passenger automobile or by the roof of the cab of a truck. A further object of the invention is to provide, in such a combination, a novel, flexible pad or platform of such construction as to be readily assembled upon the roof of a conventional vehicle and to be secured thereto by a series of clamps engaging parts of the vehicle roof, said pad carrying one element of such an articulated joint, matable with a cooperating element of such a joint carried upon a forwardly projecting, elevated tongue comprising a portion of the frame of the towed vehicle.

Another object of the invention is to provide, in such an assembly, a pair of mating joint elements, one mounted on the roof of the towing vehicle and the other mounted on the elevated tongue of the towed vehicle, such elements being so constructed and arranged that a towing connection may be established between the vehicles at a time when the tongue of the towed vehicle is supported upon tongue-carried legs whereby movement of the towing vehicle under its own power will produce corresponding movement of the towed vehicle automatically to render the tongue-supporting means ineffective whereby the tongue will settle upon the roof to complete the joint assembly. Still another object of the invention is to provide, in such an assembly, latch means and detent means effective, after completion of the joint assembly, to retain the joint elements in assembled relation.

A further object of the invention is to provide, in such a combination, manually manipulable means, accessible to the occupant of the driver's seat of the towing vehicle, for moving the latch means and the detent means during assembly or disassembly of the towing joint.

A further object of the invention is to provide novel means establishing, between such a towing vehicle and towed vehicle, an operative connection to steer the dirigible wheels of the towed vehicle in response to turning movement of the towing vehicle, such means being of such character as to accommodate itself to unevennesses or changes in pitch of the road surface upon which the vehicles may be moving.

Still further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

FIG. 9 is an elevational view of a towed vehicle coupled to a fragmentarily-shown towing vehicle and illustrating details of an optional steering connection for the dirigible wheels of the towed vehicle; and FIG. 10 is a plan view of such steering connection, the body of the towed vehicle being removed.

Figure 3:
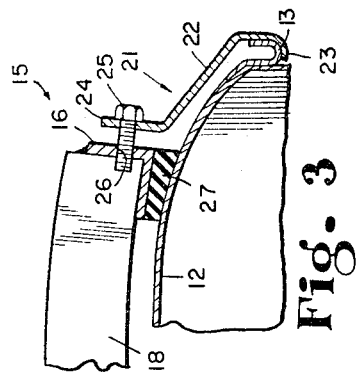
FIG. 3 is a fragmentary section, taken substantially on the line 3—3 of FIG. 1 and drawn to an enlarged scale to illustrate the clamping means whereby such pad may be readily secured to the vehicle roof.

Referring more particularly to the drawings, it will be seen that the reference numeral 11 indicates generally a conventional passenger automobile with a rigid top 12, conventionally provided with lateral guttering 13 and 14. It is desirable to support a portion of the weight of the towed vehicle upon the towing vehicle in a region of maximum strength of the towing vehicle and in a region between the front and rear wheels of the towing vehicle. To that end, I propose to locate the articulated towing coupling between the vehicles approximately centrally on the rigid roof of the towing vehicle. This results in numerous advantages, not the least of which is a significant reduction in the over-all length of the two-vehicle assembly.

According to the present invention, then, a flexible pad or platform, indicated generally by the reference numeral 15 may consist of a pair of lateral frame members 16 and 17 joined by crossed, transverse frame members 18 and 19, said transverse members being pivotally connected at their midpoints 20. Thus, the spacing between the members 16 and 17 is variable for accommodation of the pad to vehicles which vary somewhat in the distance between their guttering elements.

Each of the members 16 and 17 carries a plurality of clamps generally designated by the numeral 21. Each such clamp may comprise a body 22 in the form, for instance, of a metal strap, provided at one end with a hook or finger 23 engageable beneath the associated gutter and provided with an upstanding tail 24 at its opposite end, perforated for the reception of a screw 25 threadedly engaged in a tapped hole 26 in the associated member 16 or 17 (see FIG. 3). Suitable padding 27 is preferably secured to the lower surface of each member 16 and 17; and it will be readily seen that, when the pad is centrally positioned on the roof 12, the fingers 23 of the members 22 associated with the frame member 16 may be engaged under the gutter strip 13 while the corresponding fingers of the clamp members associated with the frame member 17 may be similarly engaged beneath the gutter element 14, whereafter the several screws 25 may be tightened to secure the pad 15 firmly in place on the roof 12 of the towing vehicle 11.

An upstanding post 30 is formed to provide a shank 31 which may act as the pivot pin penetrating the transverse frame members 18 and 19 at their midpoint, said shank being threaded at its lower end for reception of a clamping nut 32. At its upper end, the post 30 is formed to provide a spheroid head 33 to constitute one member of an articulated joint.

Figure 5:
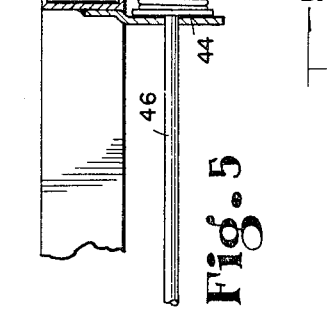
FIG. 5 is a fragmentary section taken substantially on the line 5—5 of FIG. 1 and drawn to an enlarged scale to illustrate an acceptable winch structure.
Figure 1:
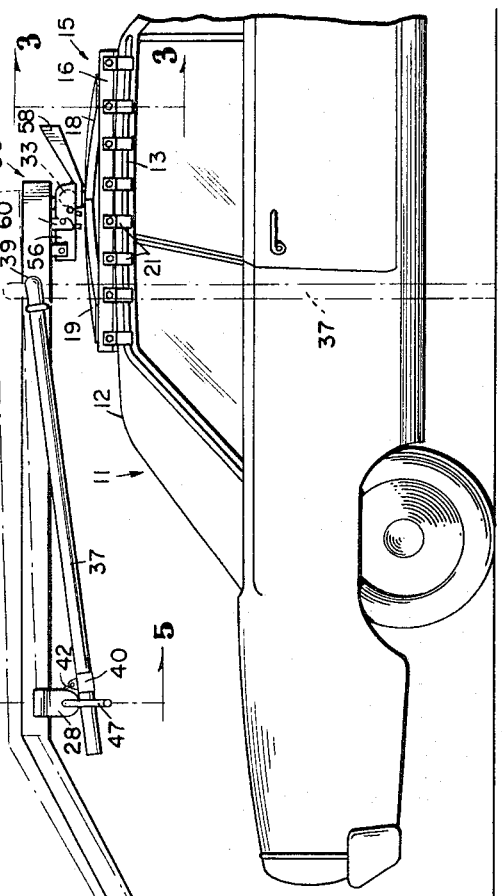
FIG. 1 is a side elevation of the frame of a towed vehicle constructed in accordance with my invention hitched to a towing vehicle shown fragmentarily.
Figure 2:
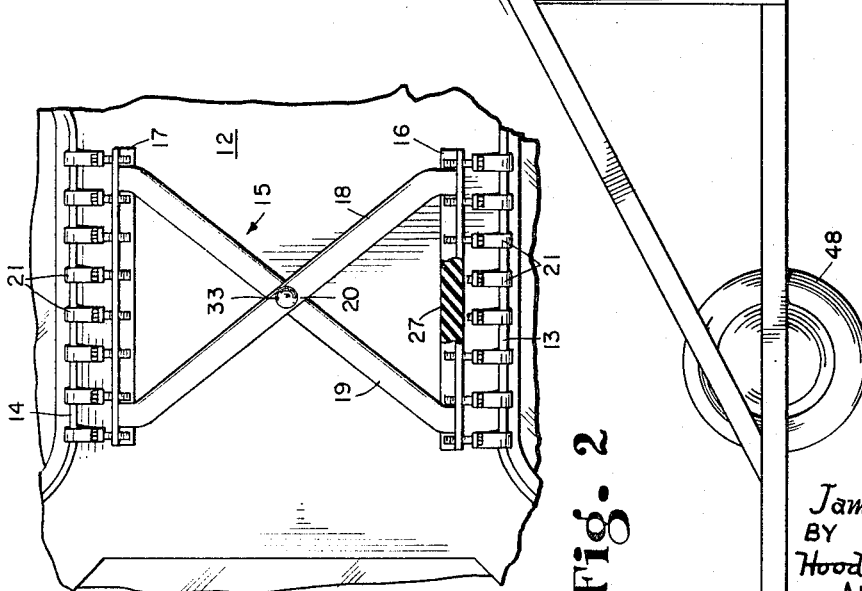
FIG. 2 is a top plan view of the pad or platform forming an element of the invention mounted on the fragmentarily-illustrated roof of a passenger compartment of a towing vehicle.
Figure 4:
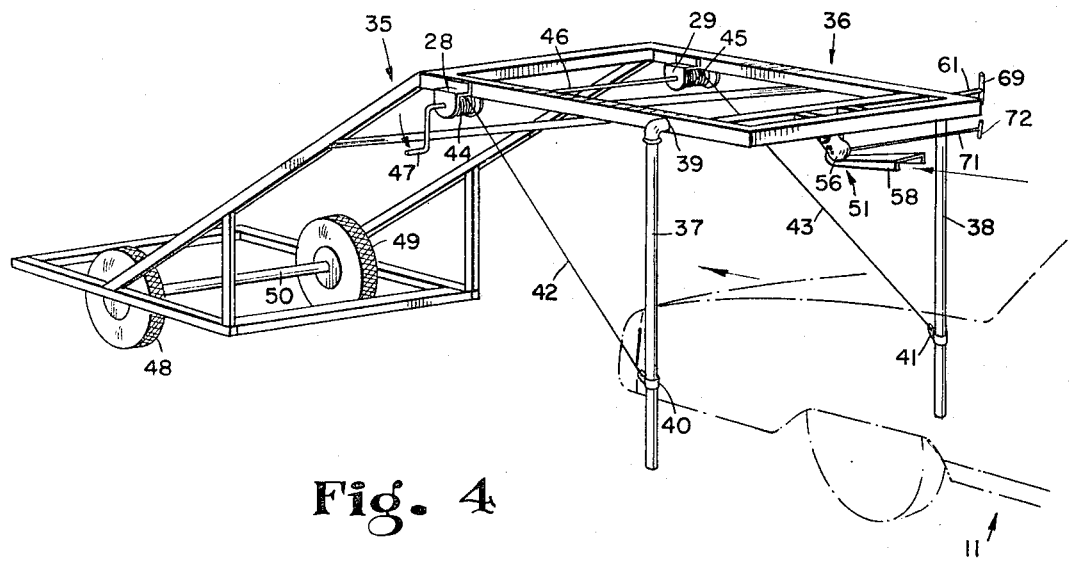
FIG. 4 is a perspective view illustrating the towed vehicle frame standing alone, a towing vehicle approaching connection with said frame being fragmentarily illustrated in broken-line outline.

A semi-trailer 34 (FIG. 9) comprises a frame 35 (FIG. 4) formed to provide a forwardly-extending, elevated tongue 36. Near its forward end, said tongue 36 carries a pair of legs 37, 38 which are pivoted to said tongue upon a common axis 39. The length of said legs is such that, when they are in vertical position as illustrated in FIG. 4 and in broken lines in FIG. 1, the tongue will be spaced significantly above the head 33 of the post 30 supported upon the roof of the towing vehicle with which the trailer is to be used. Near their lower ends, the legs carry hasps 40 and 41, respectively, to which are attached flexible strands 42 and 43, such as cables or chains, said strands being wound upon winches 44 and 45 which are respectively journalled in brackets 28 and 29 near the rearward end of the tongue 36. Preferably, the two winches are fixed to a common shaft 46 so that they will be synchronously rotated by a common operating handle or crank 47 with which is preferably associated detent means 47' (see FIG. 5). The rear end of the frame 35 is supported upon wheels 48 and 49 mounted on axle means 50 which may be single, as shown, or may consist of separate stub axles. As will appear hereinafter, the wheels 48 and 49 will preferably be dirigible.

Figure 6:
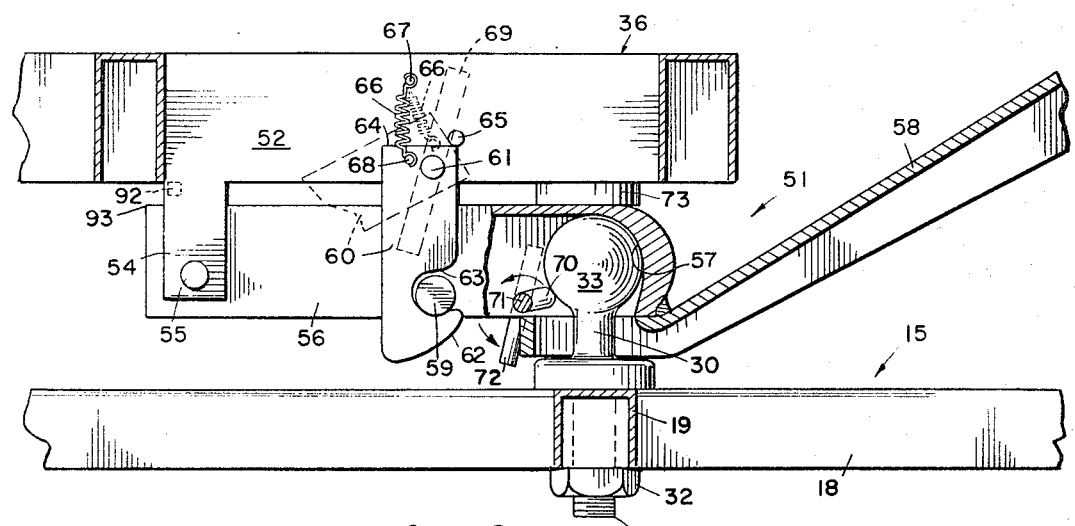
FIG. 6 is an enlarged, side elevation of the towing coupling constituting a part of my invention, parts being broken away or shown in section for clarity of illustration.
Figure 8:
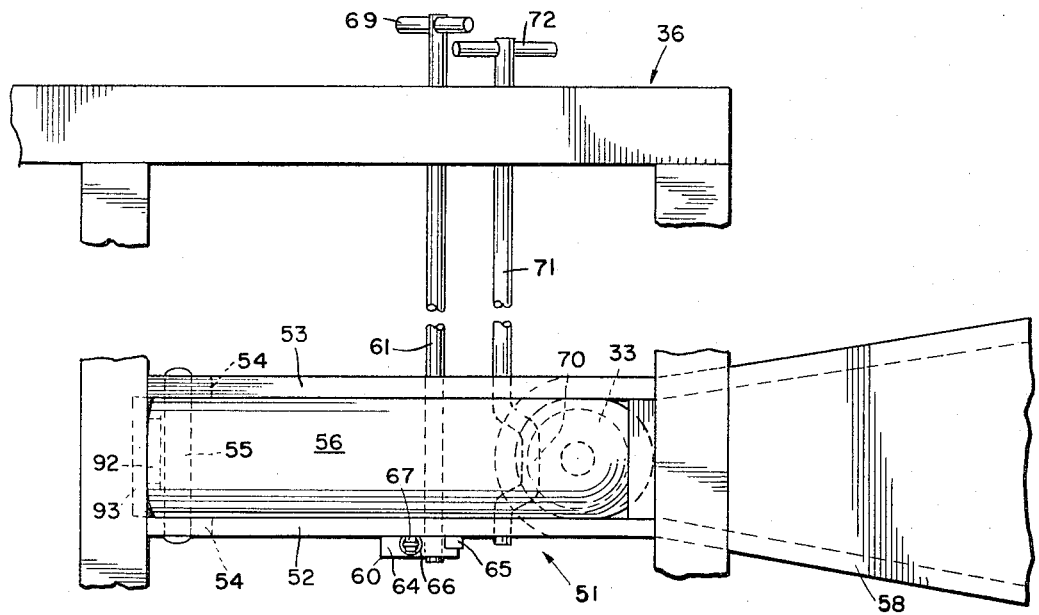
FIG. 8 is a top plan view of the coupling.
Figure 7:
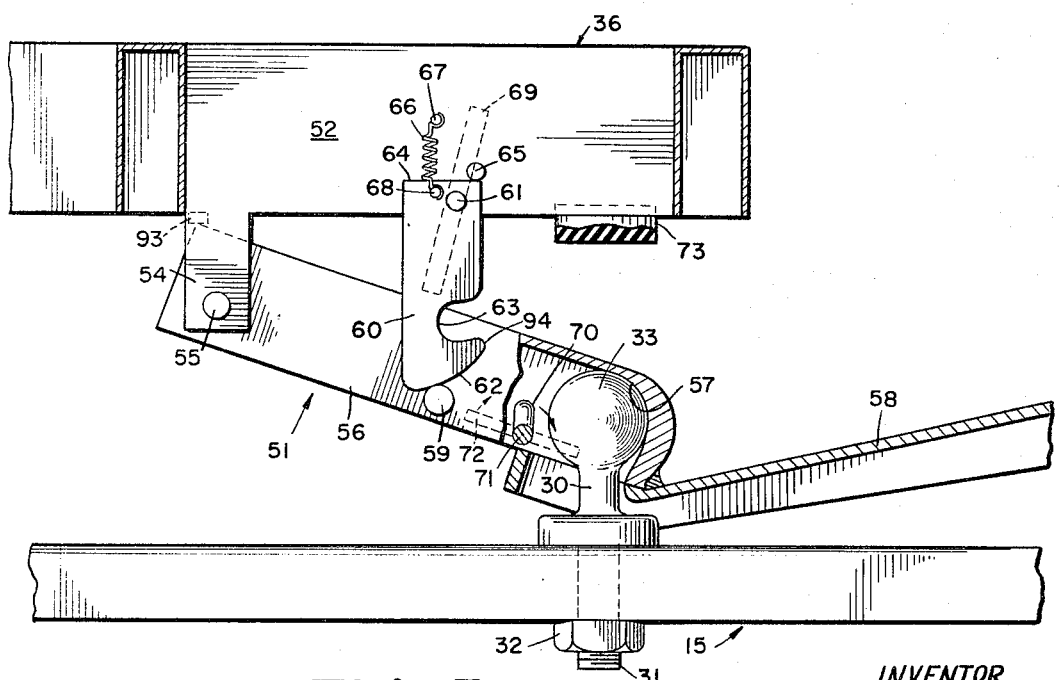
FIG. 7 is a similar view, with the parts in an intermediate condition.

Centrally at its forward end, the tongue 36 carries means, indicated generally by the reference numeral 51, for mating with the post head 33 to establish a towing coupling or hitch. Referring more particularly to FIGS. 6, 7 and 8, it will be seen that I have shown parallel, longitudinally extending plates 52 and 53 provided, near their rearward ends, with depending ears 54 spanned by a pivot pin 55 upon which is suspended the rear end of a mating hitch member 56. Adjacent its forward end, the member 56 is formed to provide a socket 57 proportioned and designed for snug, articulate reception of the post head 33. Projecting forwardly and upwardly from the forward end of the member 56 is a scoop 58 for a purpose which will appear.

Intermediate its ends, the member 56 is provided with a laterally projecting catch pin 59 for cooperation with a pivoted latch member 60 which is fixed to a rod 61 journalled in the plates 52 and 53. At its lower end, the latch member 60 is formed with a cammed surface 62 registering with the catch pin 59 and merging with a forwardly opening notch 63.

The upper, squared end 64 of the latch member 60 cooperates, in a manner to be described, with a stop pin 65 fixed to the plate 52. A compression spring 66 is confined between an abutment 67 on the plate 52 and an abutment 68 on the latch member 60 at a point spaced rearwardly from the rod 61, as shown in solid lines in FIG. 6. Thus, the spring 66 yieldably retains the squared end 64 of the latch member 60 in engagement with the stop pin 65.

The rod 61 extends beyond the plate 53 and through the side rail of the tongue 36 to carry, at its leftward extremity, an operating handle 69 which, as is most clearly shown in FIG. 9, is disposed near, and accessible through, the window of the towing vehicle adjacent the operator's seat of such vehicle. The parts are so proportioned and designed that the occupant of that seat can reach and manipulate the handle 69 without leaving his seat.

It will be apparent that, if the handle 69 is turned in a clockwise direction as viewed in FIG. 6, the latch member 60 will be moved from its solid line position toward its broken line position and that, as said latch member approaches its broken line position, the extension of a line joining the abutments 67 and 68 will cross the axis of the rod 61 so that the spring 66 will then act yieldably to retain the squared end 64 of the latch member in contact with the stop pin 65 to hold said latch member in inactive position.

Except when the catch pin 59 is received in the notch 63 of the latch member 60, the member 56 will hang downwardly substantially in the position illustrated in FIG. 7, the upper rear corner 93 of said member engaging a suitable stop 92 to limit the downward movement of the forward end of said member 56.

Normally, when the trailer is parked in the condition of FIG. 4, the catch pin 59 will be engaged in the notch 63, so that the rearward end of the member 56 will be held substantially in contact with the resilient pad 73. If, now, the vehicle 11 is moved rearwardly under its own power between the legs 37 and 38 which are spaced apart a distance slightly in excess of the lateral width of the towing vehicle with which the trailer is to be used, the head 33 will engage in the scoop 58, whereby accurate registry will be facilitated, and rearward movement of the towing vehicle will be continued until the head 33 is in true registry with the socket 57. Now, the handle 69 is turned in a clockwise direction as viewed in FIG. 6 to disengage the latch member from the catch pin 59, whereupon the rearward end of the member 56 will drop to engulf the head 33, establishing the condition illustrated in FIG. 7.

Detent means 70 is formed or carried on a rod 71 which is journalled in the member 56 and which extends into proximity to the window adjacent the driver's seat of the towing vehicle, where it carries a manipulating handle 72. If, for any reason, the rearward end of the member 56 does not of itself settle satisfactorily onto the head 33, a downward pull on the handle 72 will move the member 56 into desired position. Now, the handle 72 is turned in a clockwise direction to move the detent 70 into engagement with the head 33, whereby relative fore-and-aft movement between the member 56 and the head 33, and removal of said head from said socket 57, are prohibited.

Now the vehicle 11 is moved forwardly and, because of the coupling between the head 33 and the member 56, the trailer 34 will be entrained therewith. Forward movement of the trailer frame will cause the legs 37 and 38 to turn in a clockwise direction about their axis 39 as viewed in FIG. 4, whereby the forward end of the tongue 36 will be permitted to settle toward the vehicle roof. This will cause counter-clockwise movement of the member 56 about its pivot 55; the catch pin 59 will act on the cammed surface 62 to move the latch member 60 in a clockwise direction until the latch toe 94 is cleared, and thereupon the spring 66 will snap the latch member 60 to the solid line position of FIG. 6. Now the lower ends of the legs 37 will be free and the winches 44 and 45 can be operated to wind in the strands 42 and 43 to move the legs 37 and 38 to the storage position illustrated in FIGS. 1 and 9.

When it is desired to disconnect the coupling, the handle 69 will be turned sufficiently to cause the spring 66 to hold the latch member 60 in its broken line position of FIG. 6. Now, the winch detent means 47' is released whereby the lower ends of the legs 37 and 38 are permitted to descend to the ground. Backward movement of the coupled vehicles will now move the legs into vertical position, lifting the forward end of the tongue 36 to the broken line position of FIG. 1. Since the member 56 is free to move about its pivot 55, it will thus assume the position of FIG. 7. Now, the handle 72 will be manipulated to shift the detent 70 out of engagement with the head 33 and to lift the rearward end of the member 56 out of engagement with the head 33. The latch 60 will now be returned to engage the catch pin 59, whereupon the vehicle 11 may be freely driven away from the self-supported trailer.

In some instances, it is found that it is desirable to provide automatic means for steering the trailer wheels; and that means must be of such character as to accommodate itself to limited relative vertical movement between the rear end of the towing vehicle and the front end of the towed vehicle resulting from unevennesses or changes of pitch in the road surface. In FIGS. 9 and 10, I have illustrated steering means meeting these requirements.

A fitting 74 is suspended from the frame 35 upon the median line of that frame for oscillation about a vertical axis 75. A tubular, open-ended sleeve 76 is suspended from said fitting 74 for oscillation about a substantially horizontal axis 77. A bar 78 is freely slidably received in the sleeve 76, said bar extending forwardly to terminate in an element of a conventional articulated coupling 79, and extending also rearwardly beyond the sleeve 76. The cooperating element of the coupling 79 is carried by a plate 80 which may be secured in any suitable manner to the towing vehicle 11.

A bracket 81 is fixed to the sleeve 76 and one end of a link 82 is pivoted to the bracket 81 at a point spaced forwardly from the axis 75. The other end of the link 82 is pivotally connected to one arm 83 of a lever 84 whose stem 85 is oscillatable about a vertical axis 86 suitably suspended from the frame 35. To the other arm 87 of the lever 84 is pivotally connected one end of a link 88 the other end of which is pivoted at 89 to a lever 90 operatively connected to turn the dirigible wheel 48. A tie rod 91 provides an operative connection between the wheels 48 and 49 to maintain parallelism thereof.

It will be apparent that, as the towing vehicle turns toward the left, for instance, its rear end will tend to move toward the right relative to the rear end of the towed vehicle and that, through the steering coupling above described, that relative movement will turn the dirigible wheels 49 toward the right to cause the wheels 48 and 49 closely to track the towing vehicle.

I claim as my invention:

1. For use with a passenger automobile having a roof and guttering at the sides of said roof, the combination of a pad comprising opposite lateral frame members, two transversely extending, crossed frame members pivotally connected at their mid-points and joining said lateral frame members, whereby the spacing between said lateral frame members is variable, clamp means carried by said lateral frame members and engageable with such guttering, an upstanding post carried by said transversely extending frame members upon an axis coincident with their point of connection and terminating in one element of a ball-and-socket joint, a semi-trailer comprising a frame having a forwardly-extending tongue disposed at an elevation above the roof of such an automobile, a mating element of said ball-and-socket joint carried adjacent the forward end of said tongue, and detent means carried by one of said joint elements and engageable with the other of said joint elements when said ball-and-socket joint is assembled.

2. The combination of claim 1 including a leg assembly carried by said tongue adjacent the forward end thereof, said leg assembly comprising two legs laterally spaced apart by a distance exceeding the over-all width of such an automobile, mounted to swing about a common axis extending transversely of said tongue, each of said legs having a length exceeding the combined height of such an automobile and said joint.

3. The combination of claim 2 including winch means mounted on said frame and flexible strand means wound on said winch means and connected to said legs near the distal ends thereof.

4. For use with a passenger automobile having a roof and guttering at the sides of said roof, the combination of a pad comprising opposite lateral frame members, transversely extending frame means joining said lateral frame members, clamp means carried by said lateral frame members and engageable with such guttering, an upstanding post carried by said transversely extending frame means and terminating in one element of a ball-and-socket joint, a semi-trailer comprising a frame having a forwardly-extending tongue disposed at an elevation above the roof of such an automobile, a mating element of said ball-and-socket joint carried adjacent the forward end of said tongue, and detent means carried by one of said joint elements and engageable with the other of said joint elements when said ball-and-socket joint is assembled, said one joint element being a spheroid head and said mating element being a socket member pivotally mounted upon a transverse axis at its rearward end below said tongue and formed near its forward end with a downwardly-opening socket adapted cooperatively to receive said head, and a latch member depending from said tongue and engageable with said socket member, at times, to restrain the forward end of said socket member against movement away from said tongue, said detent means being carried by said socket member and engageable with said head, at times, to block removal of said head from said socket.

5. The combination of claim 4 in which said joint is disposed near the longitudinally-extending median plane of such an automobile, and a handle operatively connected to said latch member and disposed near one lateral boundary of said frame, said handle being accessible to an occupant of the driver's seat of such an automobile and being manipulable to disengage said latch member from said socket member.

6. For use with a towing vehicle and a towed vehicle, a hitch comprising an upstanding post on the towing vehicle terminating in a spheroid head, a forwardly-extending tongue on the towed vehicle adapted to overlie said post, a socket member pivotally mounted upon a transverse axis at its rearward end below the forward end of said tongue and formed near its forward end with a downwardly-opening socket adapted cooperatively to receive said head, a latch member depending from said tongue and engageable with said socket member, at times, to restrain the forward end of said socket member against movement away from said tongue, and detent means carried by said socket member and engageable with said head, at times, to block removal of said head from said socket.

7. The hitch of claim 6 in which said latch member is pivotally supported from said tongue upon an axis parallel with said transverse axis, and spring means operatively associated with said latch member and with said tongue and yieldably urging said latch member, at times, toward latching engagement with said socket member.

8. The hitch of claim 7 in which said spring means is arranged to pass a dead center position as said latch member is moved away from latching position.

9. The hitch of claim 6 in which said socket member is provided with abutment means, said latch member being pivotally supported from said tongue upon an axis parallel with said transverse axis and disposed between said transverse axis and the distal end of said socket member, said latch member being formed with an open notch in one edge adapted retainingly to receive said abutment means, spring means cooperatively engaged between said tongue and said latch member at a point offset in one direction from said latch member axis, at times, to urge said one edge yieldably toward said distal end of said socket member, and means for moving said latch member against the tendency of said spring means to disengage said notch from said abutment means and to shift said point to a position offset in the opposite direction from said latch member axis, whereby said spring means urges said one edge yieldably away from said distal end.

10. The hitch of claim 9 in which said post is disposed on the roof of such towing vehicle and said means for moving said latch member against the tendency of said spring means comprises a handle operatively connected to said latch member and disposed in a position accessible, through a window of the towing vehicle, to an operator seated in the driver's seat of such vehicle.

11. For use with a towing vehicle and a towed vehicle, said towing vehicle having a roof, an upstanding post on the roof of said towing vehicle terminating in a spheroid head, the towed vehicle comprising a frame having a forwardly-extending tongue adapted to overlie said post, means carried by said tongue and engageable with the head of said post to establish a towing hitch between the towed vehicle and the towing vehicle, axle means for said frame at a location remote from said tongue, a wheel dirigibly mounted at each end of said axle means, tie rod means connecting said wheels to maintain substantial parallelism thereof, a longitudinally-extending bar suspended from said frame for oscillation about a substantially vertical axis, means carried by said bar at a point spaced forwardly from said axis for operative connection to the towing vehicle, link means operatively connected at one end to said bar, lever means suspended from said frame for oscillation about a second axis substantially parallel with said first-named axis, the other end of said link means being connected to one arm of said lever means, and second link means providing an operative connection between the other arm of said lever means and one of said wheels to turn said wheels about their dirigible mountings in the direction of movement of said bar about said first-named axis.

12. In a semi-trailer having a frame, axle means supporting said frame, a wheel dirigibly mounted at each end of said axle means, tie rod means connecting said wheels to maintain substantial parallelism thereof, a longitudinally-extending bar suspended from said frame for oscillation about a substantially vertical axis, means carried by said bar at a point spaced forwardly from said axis for operative connection to a towing vehicle, link means operatively connected at one end to said bar, lever means suspended from said frame for oscillation about a second axis substantially parallel with said first-named axis, the other end of said link means being connected to one arm of said lever means, and second link means providing an operative connection between the other arm of said lever means and one of said wheels to turn said wheels about their dirigible mountings in the direction of movement of said bar about said first-named axis.

13. The combination of claim 12 in which said bar is also oscillatable relative to said frame about a substantially horizontal axis.

14. The combination of claim 12 in which the suspension for said bar comprises sleeve means carried by said frame and oscillatable about said first-named vertical axis, said bar being telescopically received and supported in said sleeve means and the connection of said first-named link means to said bar being through said sleeve means.

15. The combination of claim 14 in which said sleeve means is open at its opposite ends and said bar extends entirely through said sleeve means and is freely longitudinally reciprocable relative thereto.

References Cited

UNITED STATES PATENTS

| | | | |
|---|---|---|---|
| 1,838,499 | 12/1931 | Robinson | 280—444 |
| 1,896,717 | 2/1933 | Mott | 280—426 |
| 2,048,310 | 7/1936 | Wohldorf | 280—508 X |
| 2,167,520 | 7/1939 | Claud-mantle | 280—512 |
| 2,526,905 | 10/1950 | Sartin | 280—150.5 |
| 2,854,256 | 9/1958 | Lamberson | 280—512 |
| 3,163,306 | 12/1964 | Bennett et al. | 280—423 X |

FOREIGN PATENTS

| | | |
|---|---|---|
| 1,250,559 | 12/1960 | France. |
| 1,320,238 | 1/1963 | France. |
| 811,601 | 4/1959 | Great Britain. |

LEO FRIAGLIA, *Primary Examiner.*